H. J. STOUT.
VENTILATOR.
APPLICATION FILED JULY 3, 1917.
1,254,445.
Patented Jan. 22, 1918.
2 SHEETS—SHEET 1.
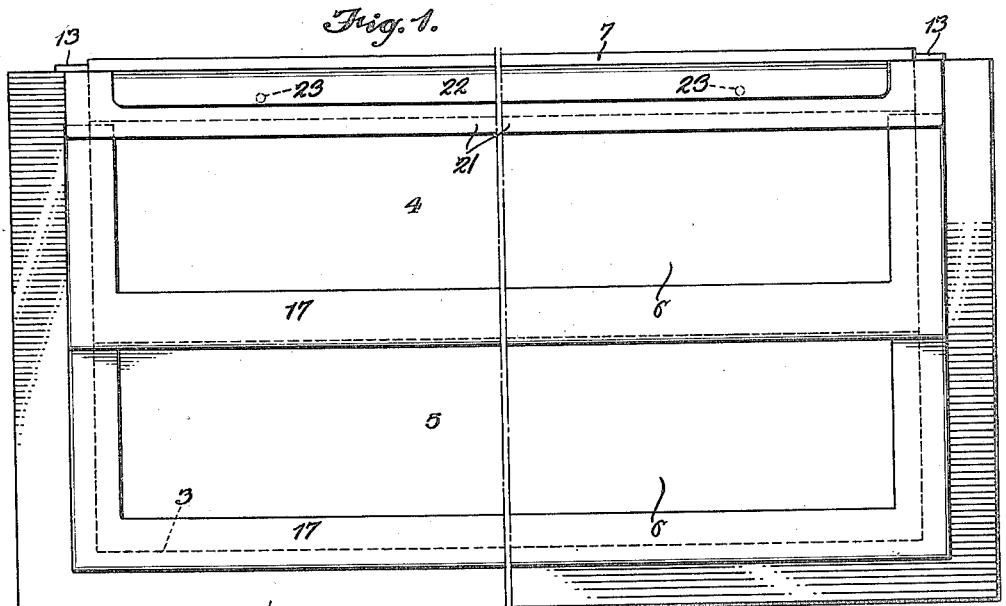
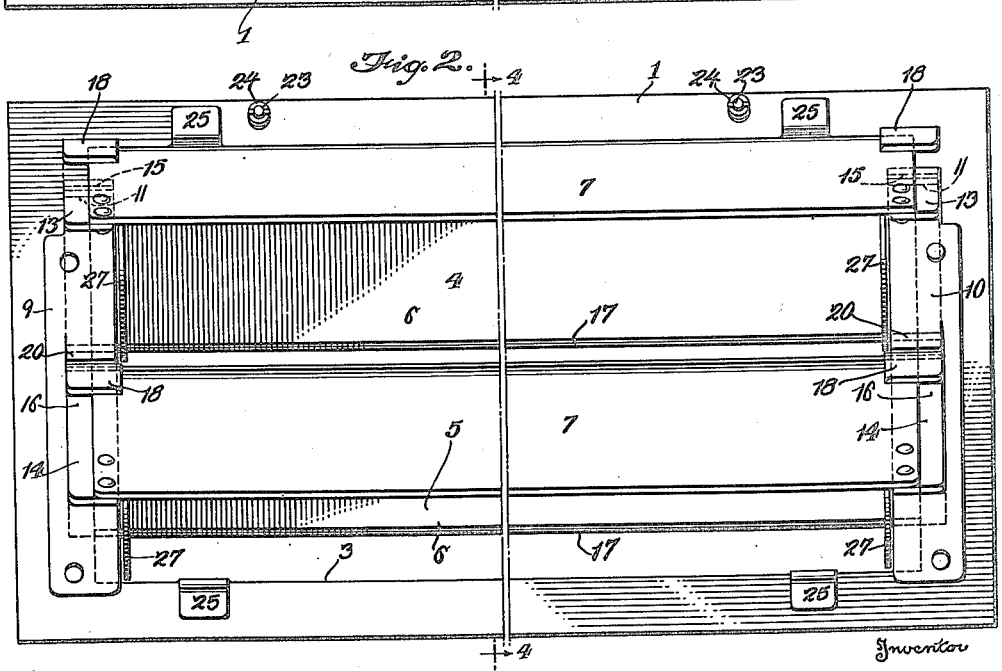
Witnesses
R. Harwood.
C. R. Ziegler.
Inventor
Henry J. Stout.
By Joshua R. H. Potts.
His Attorney

H. J. STOUT.
VENTILATOR.
APPLICATION FILED JULY 3, 1917.

1,254,445.

Patented Jan. 22, 1918.
2 SHEETS—SHEET 2.

Witnesses
R. Harwood.
C. R. Ziegler.

Inventor
Henry J. Stout.
By Joshua R H Potts.
his Attorney

UNITED STATES PATENT OFFICE.

HENRY JACOB STOUT, OF PHILADELPHIA, PENNSYLVANIA.

VENTILATOR.

1,254,445.  Specification of Letters Patent.  Patented Jan. 22, 1918.

Application filed July 3, 1917.  Serial No. 178,401.

*To all whom it may concern:*

Be it known that I, HENRY J. STOUT, a citizen of the United States, residing at Philadelphia, in the county of Philadelphia and State of Pennsylvania, have invented certain new and useful Improvements in Ventilators, of which the following is a specification.

My invention consists of an improved ventilator and is especially adapted for use on automobiles or other vehicles. One object of my invention is to provide a ventilator which can be quickly and cheaply attached to an automobile and which will be capable of ventilating the interior of the latter and particularly the space occupied by the legs and feet of the driver, since this space often becomes extremely hot because of its close proximity to the engine.

Another object is to so construct my improved ventilator that when closed it will exclude rain water, but when open will deflect air toward the floor of the vehicle.

A further object is to make my invention of a durable construction and so that it can be quickly and easily manipulated.

These objects, and other advantageous ends which will be described hereinafter, I attain in the following manner, reference being had to the accompanying drawings in which Figure 1 is an outside face view of my invention showing certain movable shutters in their closed positions.

Fig. 2 is a rear face view of my invention showing the shutters in their open positions.

Fig. 5 is a fragmentary view showing how my invention is fitted to the cowl of an automobile.

Figure 3:
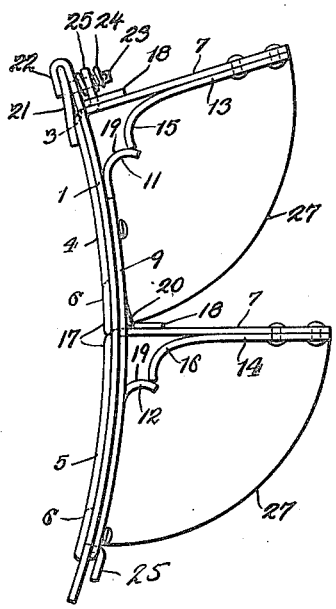
Fig. 3 is an end view of Fig. 1.
Figure 4:
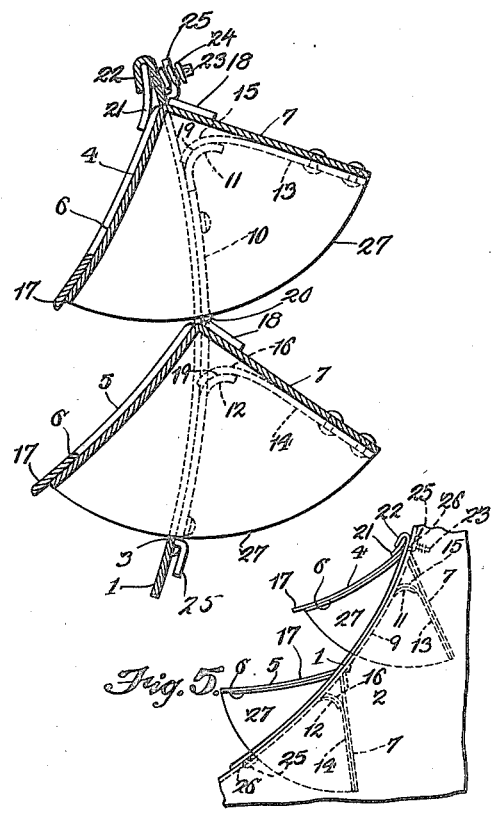
Fig. 4 is a sectional view taken on the line 4—4 of Fig. 2.
Figure 6:
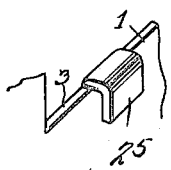
Fig. 6 is a fragmentary perspective view showing one of a number of securing clips with which I preferably provide my invention.
Figure 7:
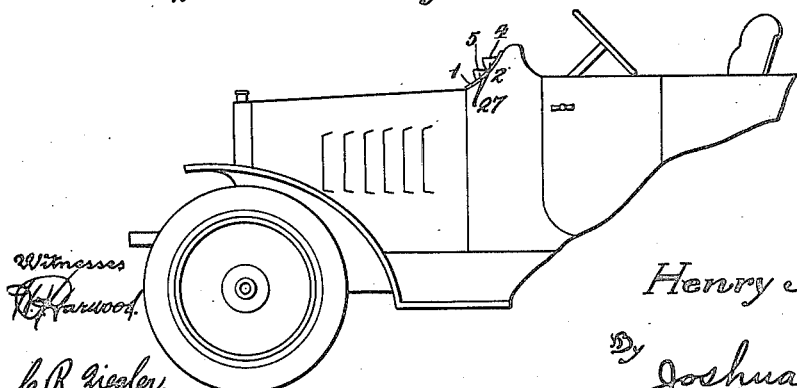
Fig. 7 is a fragmentary view of an automobile showing a desirable position of my invention thereon.

Referring to the drawings, 1 is a frame which is preferably stamped out of sheet metal and curved as clearly shown in Figs. 3 to 5 to correspond with the curvature of the cowl 2 of an automobile.

The opening 3 provided by the frame 1, has in the present instance, two shutters 4 and 5 which are designed to swing therein in a manner hereinafter described. In the accompanying drawings only two shutters are illustrated, but it will be understood that any number can be employed.

Each of the shutters 4 and 5 is preferably made of a single sheet of metal which is bent within its width and throughout its length to provide flanges 6 and 7 which are angularly disposed to each other as clearly shown in Fig. 4. The height of the opening 3 is such as to be completely closed by the front flanges 6 when they are in the position shown in Fig. 3.

The flanges 7 serve as deflectors to deflect the air downwardly when the shutters are in their open position as shown in Fig. 4, since air passing through the opening 3 will impact with the flanges 7, and as these latter flanges slant downwardly, the air will be deflected downwardly and toward the floor of the automobile.

Retaining strips 9 and 10 are secured to the rear face of the frame 1 and are preferably made of spring steel. The retaining strip 9 has two rearwardly curved projections 11, and the strip 10 has two similarly formed projections 12. These projections are preferably formed by slitting the retaining strips 9 and 10 within their length and then bending a part of the slit portion rearwardly.

The opposite ends of the flanges 7 are also provided with strips 13 and 14, and these strips have forwardly curved ends 15 and 16 respectively. These curved ends are designed to overlap the curved projections 11 and 12 when the shutters are moved into their open positions as shown in Fig. 4, the overlapping being such that the projections 11 and 12 fit within the inner curves of the curved ends 15 and 16, and thus retain the shutters in their open positions.

The shutters are prevented from bodily moving forwardly or rearwardly through the opening 3 by the means about to be described. Each of the front flanges 6 has a facing strip 17 which is secured along the bottom and side edges by brazing or other means. These facing strips 17 project beyond the side and bottom edges of the flanges 6 and abut the outer face of the frame 1 adjacent the opening 3 as clearly shown in Figs. 1 and 3.

Each of the flanges 7 has lugs 18 projecting beyond their ends in the direction of the length of said flanges so that the facing strips 17 on the flanges 6, and the lugs 18 on the flanges 7, prevent the shutters 4 and 5 from being pushed through the opening, but permit the shutters to be rocked within the opening to perform the functions above described.

As illustrated in Fig. 3, it will be noted that the extreme ends of the curved portions 15 and 16 rest upon the rearwardly curved projections 11 and 12 and in order to rock the shutters 4 and 5, it is necessary to exert sufficient pressure downwardly on the flanges 7 to cause the extreme edges of the portions 15 and 16 to ride over the high portions 19 of the projections 11 and 12. In other words, it will be necessary for the portions 11 and 15, and 12 and 16, to respectively yield in order to open the shutters and to secure the overlapping positions as illustrated in Fig. 4. Thus, when the shutters are closed, no accidental movement or jar of the automobile is sufficient to open the shutters. It will be further noted that the rearwardly curved projections 11 and 12 form supporting means upon which the curved ends 15 and 16 rest and are adapted to slide when the shutters are rocked. Since the supporting projections 11 and 12 are mounted independently of the shutters, the ends 15 and 16 on the shutters are free to slide thereon when sufficient pressure is applied to the portions 7 of the shutters to cause the ends 15 and 16 to ride over the high portions 19, as above described. Thus the relative engagement of the ends 15 and 16 with the projections 11 and 12 prevents the shutters from sliding downwardly within the opening of the frame and at the same time permits them to rock within the opening. Also by making the parts 11, 12, 15, and 16 yieldable, as above described, they serve to hold the shutters against rattling due to vibration and thus render my invention valuable on automobiles or other vehicles.

Each of the retaining strips 9 and 10 also has a rearwardly bent lip 20 against which the lugs 18 on the shutter 5 abut. These lips 20 being resilient, will place a certain amount of tension on the lugs 18 and will thereby hold the inner surface of the facing strip 17 of the shutter 5 against the forward surface of the frame 1. This is an extremely valuable feature of my invention since it causes the upper portion of the shutter 5 to closely hug the frame 1 so that if desired the shutter 5 can be opened independently of the shutter 4 or vice versa, the shutter 4 can be opened independently of the shutter 5, the tension of the lips 20 always causing the upper portion of the shutter 5 to ride under the lower portion of the shutter 4.

A strip 21, preferably of sheet metal, is held between the fold of the down-turned upper edge 22 of the frame 1 and forms a water shed for the upper portion of the shutter 4.

As illustrated in the present instance, I provide this strip with two rearwardly projecting pins 23 which extend through holes in the frame 1 and are provided with coiled tension springs 24 so that the strip 21 is always held in engagement with the front of the shutter 4, but will yield when the latter is rocked into its open position.

The frame 1, at points adjacent the opening 3, has clips 25, these clips being designed to be projected through an opening 26 cut in the cowl 2 of the automobile and clamped to secure the frame 1 to the forward face of the cowl. Thus, my invention can be quickly secured in position merely by inserting the clips 25 through the opening 26 cut in the cowl and afterward bending them downwardly and upwardly as shown in Figs. 3 to 6 inclusive.

It will be further noted that the rearwardly projecting curved portions 11 and 12 of the retaining strips 9 and 10 serve to support the weight of the shutters 4 and 5 and therefore no hinged portions are necessary, since the shutters are confined between the facing strips 17, lugs 18, and rearwardly projecting curved portions 11 and 12 as above mentioned.

Each of the shutters 4 and 5 is provided adjacent its ends with segmental plates 27, thus air is prevented from passing longitudinally of the shutters as would otherwise occur if the segmental plates 27 were not provided.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A ventilator comprising a frame having an opening, a shutter, said shutter having parts for engagement with the opposite surfaces of said frame adjacent said opening, and supporting means mounted independently of the shutter and disconnected therefrom, said shutter having a portion yieldable relatively to said supporting means and adapted to rest upon said means, said portion being adapted to slide thereon to permit the shutter to pivot within said opening, substantially as described.

2. A ventilator including a frame having an opening, a plurality of shutters having angularly disposed flanges and adapted to movably fit within said opening, parts on each of said shutters adapted to engage the forward and rear surfaces of the frame, retaining means on said frame having curved projections, and members on each of said shutters adapted to frictionally engage and spring over said curved projections to hold the shutters in various pivotal positions, substantially as described.

3. A ventilator including a frame having an opening, a plurality of shutters having angularly disposed flanges and adapted to movably fit within said openings, parts on each of said shutters adapted to engage the forward and rear surfaces of the frame, retaining means on said frame having curved projections, members on each of said shutters adapted to frictionally engage and spring over said curved projections to hold the shutters in various pivotal positions, and resilient lips supported independently of the shutters and adapted to engage the rear parts on certain of said shutters, substantially as described.

4. A ventilator comprising a frame having an opening, a plurality of shutters each having angularly disposed flanges, said shutters having parts for engagement with the opposite surfaces of said frame adjacent said opening, supporting means mounted independently of the shutters and disconnected therefrom, said shutters having portions normally resting and adapted to operatively slide upon said supporting means to permit the shutters to pivot within said opening, and resilient means for holding certain of said parts on certain of the shutters against the forward surface of the frame, said resilient means being located adjacent the junction of the angularly disposed flanges of said latter mentioned shutters, substantially as described.

5. A ventilator comprising a frame having an opening, a shutter, said shutter having parts for engagement with the opposite surfaces of said frame adjacent said opening, supporting means mounted independently of the shutter and disconnected therefrom, said shutter having a portion adapted to rest and slide upon said means to permit the shutter to pivot within said opening, a strip overlapping the upper portion of said opening and the portion of said shutter, and resilient means for holding said strip in engagement with the shutter, substantially as described.

6. A ventilator including a frame having an opening, a shutter having angularly disposed flanges and adapted to movably fit within said opening, parts on said shutter adapted to engage the forward and rear surfaces of said frame, retaining means on said frame having curved projections, and members on said shutter adapted to frictionally engage and spring over said curved projections to hold the shutter in various pivotal positions, substantially as described.

In testimony whereof I have signed my name to this specification in the presence of two subcribing witnesses.

HENRY JACOB STOUT.

Witnesses:
MARY A. INGLAR,
CHAS. E. POTTS.